(12) United States Patent
Huang et al.

(10) Patent No.: US 10,985,952 B1
(45) Date of Patent: Apr. 20, 2021

(54) DATA TRANSMISSION APPARATUS AND METHOD APPLIED TO HIGH-SPEED WIRED NETWORK

(71) Applicant: Realtek Semiconductor Corp., HsinChu (TW)

(72) Inventors: Yu-Xuan Huang, HsinChu (TW); Liang-Wei Huang, HsinChu (TW)

(73) Assignee: Realtek Semiconductor Corp., HsinChu (TW)

(*) Notice: Subject to any disclaimer, the term of this patent is extended or adjusted under 35 U.S.C. 154(b) by 0 days.

(21) Appl. No.: 17/065,525

(22) Filed: Oct. 8, 2020

(30) Foreign Application Priority Data

Dec. 17, 2019 (TW) .................................. 108146088

(51) Int. Cl.
*H04L 25/03* (2006.01)
(52) U.S. Cl.
CPC .............................. *H04L 25/03885* (2013.01)
(58) Field of Classification Search
CPC ........... H04L 25/03885; H04L 27/2647; H04L 25/03057; H04L 2025/03617
See application file for complete search history.

(56) References Cited

U.S. PATENT DOCUMENTS

| 8,290,033 B2* | 10/2012 | Garg | H04L 25/03057 375/231 |
| 2006/0034363 A1* | 2/2006 | Wang | H04L 25/03057 375/233 |
| 2006/0227859 A1* | 10/2006 | Wei | H04L 25/03057 375/233 |
| 2019/0081836 A1* | 3/2019 | Hadani | H04L 5/0048 |
| 2020/0403829 A1* | 12/2020 | Namboodiri | H04L 5/0007 |

OTHER PUBLICATIONS

Shou-Yin Liu, Jong-Wha Chong, "A Study of Joint Tracking Algorithms of Carrier Frequency Offset and Sampling Clock Offset for OFDM-based WLANs", pp. 109-113, vol. 1, IEEE, Jan. 2002.

* cited by examiner

*Primary Examiner* — Freshteh N Aghdam
(74) *Attorney, Agent, or Firm* — Winston Hsu

(57) ABSTRACT

A method of a data transmission apparatus applied in high-speed wired network includes: performing analog-to-digital conversion operation upon a time-domain analog training data signal transmitted from a link partner device to generate a time-domain digital training data signal; converting the time-domain digital training data signal into a frequency-domain training data signal; performing a frequency-domain feed-forward equalization (FFE) operation upon the frequency-domain training data signal to generate a frequency-domain FFE resultant signal; converting the frequency-domain FFE resultant signal into a time-domain FFE resultant signal; generating a difference resultant signal according to the time-domain FFE resultant signal and a feed-back equalization (FBE) resultant signal; receiving the difference resultant signal to generate a slicer resultant signal; and using the FBE operation to generate the FBE resultant signal according to the slicer resultant signal.

16 Claims, 6 Drawing Sheets

DATA TRANSMISSION APPARATUS AND METHOD APPLIED TO HIGH-SPEED WIRED NETWORK

BACKGROUND OF THE INVENTION

1. Field of the Invention

The invention relates to a timing recovery scheme, and more particularly to a data transmission apparatus and method applied to a timing recovery scheme of a high-speed wire network.

2. Description of the Prior Art

Generally speaking, a conventional timing recovery scheme of a wired network may adopt a conventional time-domain phase tracking operation to track the phase error of two devices between the channel, to make the frequencies of the two device between the channel be kept synchronized. However, the conventional time-domain phase tracking operation needs to wait for a comparatively longer convergence time to successfully track and lock the phase error, and the phase variation range accepted by such conventional time-domain phase tracking operation is also limited. Thus, it is difficult to apply the conventional time-domain phase tracking operation to the channel of a high-speed or super-speed wired network.

SUMMARY OF THE INVENTION

Therefore one of the objectives of the invention is to provide a data transmission apparatus and method which are applied to a high-speed wired network and capable of rapidly tracking and lock a phase offset, to solve the above-mentioned problems encountered by the conventional time-domain phase tracking operation.

According to embodiments of the invention, a data transmission apparatus applied to a high-speed wired network is disclosed. The data transmission apparatus comprises an analog-to-digital converter (ADC), a transform circuit, a feed-forward equalizer circuit, an inverse transform circuit, an adder, a slicer, and a feed-back equalizer circuit. The ADC is used for receiving a time-domain analog training data signal, transmitted from a link partner device and through a channel, to perform an analog-to-digital conversion operation upon the time-domain analog training data signal to generate a time-domain digital training data signal. The transform circuit is coupled to the ADC and is used for converting the time-domain digital training data signal into a frequency-domain training data signal. The feed-forward equalizer circuit is coupled to the transform circuit, and is used for receiving the frequency-domain training data signal and performing a frequency-domain feed-forward equalization (FFE) operation upon the frequency-domain training data signal to generate a frequency-domain FFE resultant signal. The inverse transform circuit is coupled to the feed-forward equalizer circuit, and is used for converting the frequency-domain FFE resultant signal into a time-domain FFE resultant signal. The adder is coupled to the inverse transform circuit and the feed-back equalizer circuit, and is used for generating a difference resultant signal according to the time-domain FFE resultant signal generate by the inverse transform circuit and a feed-back equalization (FBE) resultant signal generated by the feed-back equalizer circuit. The slicer is coupled to the adder and the feed-back equalizer circuit, and is used for receiving the difference resultant signal to generate a slicer resultant signal to the feed-back equalizer circuit. The feed-back equalizer circuit is coupled to the slicer and the adder, and is used for generating the FBE resultant signal according to the slicer resultant signal.

According to the embodiments, a method of a data transmission apparatus applied to a high-speed wired network is disclosed. The method comprises: using an ADC to receive a time-domain analog training data signal, sent from a link partner device and through a channel, to perform an analog-to-digital conversion operation upon the time-domain analog training data signal to generate a time-domain digital training data signal; transforming the time-domain digital training data signal into a frequency-domain training data signal; receiving the frequency-domain training data signal and performing a frequency-domain FFE operation upon the frequency-domain training data signal to generate a frequency-domain FFE resultant signal; transforming the frequency-domain FFE resultant signal into a time-domain FFE resultant signal; using an adder to generate a difference resultant signal according to the time-domain FFE resultant signal and an FBE resultant signal generated by a feed-back equalizer circuit; using a slicer to receive the difference resultant signal to generate a slicer resultant signal to the feed-back equalizer circuit; and using the feed-back equalizer circuit to generate the FBE resultant signal according to the slicer resultant signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
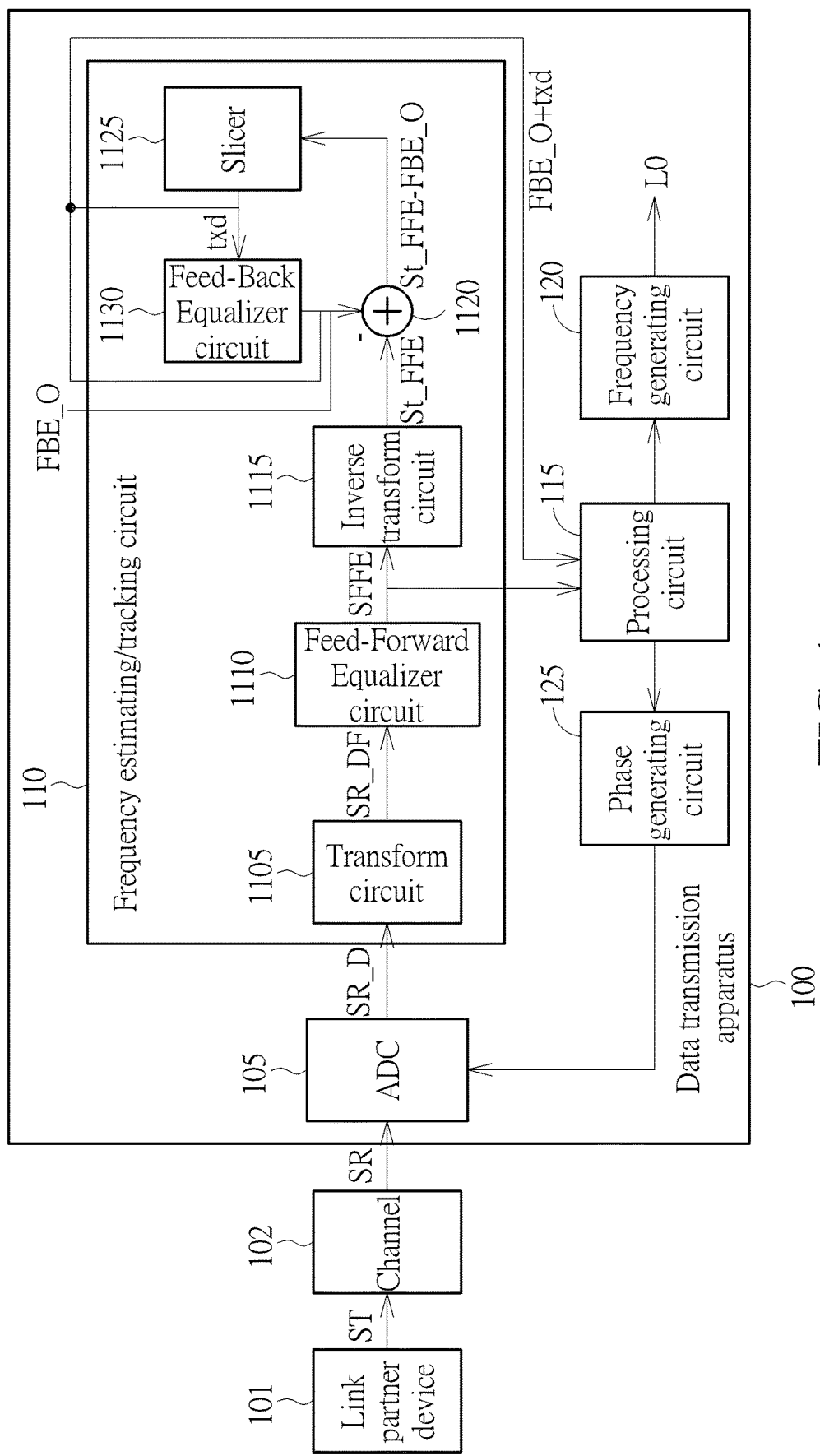
FIG. 1 is a circuit block diagram of a data transmission apparatus operating in a first training phase/period of a training mode according to an embodiment of the invention.

Refer to FIG. 1. FIG. 1 is a circuit block diagram of a data transmission apparatus 100 operating in a first training phase/period of a training mode according to an embodiment of the invention. The data transmission apparatus 100 is applied to a wired network such as a high-speed wired network (but not limited) and is connected to a link partner device 101 through IEEE 802.3 Ethernet family standards. IEEE 802.3 Ethernet family standards are for example 10G/5G/2.5G Base-T high-speed Ethernet communication standards with four-pair cable wires (but not limited); the number of paired cable wires is determined based on IEEE 802.3 Ethernet family standards. The data transmission apparatus 100 can support data transmission and reception of high-speed Ethernet. The data transmission apparatus 100 in the embodiment is used for employing frequency-domain signal equalization to more rapidly and accurately estimate and/or track the phase errors of signals between the data transmission apparatus 100 and the link partner device as well as to reduce inter-symbol interference (ISI) of the transmission channel between the two devices, to accordingly calibrate the phase difference of the local oscillation frequency LO of the data transmission apparatus 100 and/or the phase difference(s) of one or more analog-to-digital converting circuits within the apparatus 100 so as to make the local oscillation frequency LO be synchronized with the frequency employed by the link partner device. For the effect, this can directly estimate and/or more rapidly track and lock the phase error by merely using a shorter convergence time in applications of the high-speed Ethernet to rapidly calibrate the frequency offset and/or phase offset. Also, the tolerance range of data transmission apparatus 100 for the frequency offsets in the embodiment can be at least ten times than that of a conventional device, to avoid that the conventional device will be easily crashed if the frequency offset between two devices and tracked by the conventional device is comparatively large.

As shown in FIG. 1, the data transmission apparatus 100 is connected to the link partner device 101 through a channel 102, and the two devices can communicate with each other to transmit/receive data through the channel 102 and via high-speed Ethernet communication standard. The high-speed Ethernet communication standard comprises the training mode, a data mode, and an Energy-Efficient-Ethernet (EEE) mode. The training mode comprises the first training phase/period and a second training phase/period which follows the first training phase/period. The EEE mode at least comprises a quiet period and a refresh period which are respectively described later.

In practice, the data transmission apparatus 100 comprises an analog-to-digital converter (ADC) 105, a frequency estimating/tracking circuit 110, a processing circuit 115, a frequency generating circuit 120, and a phase generating circuit 125. The frequency estimating/tracking circuit 110 comprises a transform circuit 1105 such as a Fast-Fourier-Transform (FFT) circuit, a feed-forward equalizer circuit 1110, an inverse transform circuit 1115 such as an Inverse-FFT (IFFT) circuit, an adder 1120, a slicer 1125, and a feed-back equalizer circuit 1130. In the training mode, the link partner device 101 is used as a master device, and the data transmission apparatus 100 is used as a slave device. The data transmission apparatus 100, used as a slave device, needs to execute/perform a timing recovery operation according to a training data signal (or referred to as a pilot signal) transmitted from the link partner device 101, to estimate or track the phase error of signals to calibrate the clock frequency of the local oscillation frequency LO and/or the phase difference(s) of one or more analog-to-digital converting circuits within the ADC 105, so that the signal frequencies between the data transmission apparatus 100 and link partner device 101 can be synchronized. Thus, in the data mode later, the data transmission apparatus 100 and link partner device 101 can be synchronized with each other to correctly transmit and receive data respectively. In addition, the above-mentioned timing recovery operation can be also applied to the EEE mode. The link partner device 101 in the training mode is arranged to send a time-domain analog training data signal ST=txd(t) to the data transmission apparatus 100. The time-domain analog training data signal ST=txd(t) is passed through the channel 102 and arrives at the data transmission apparatus 100. Since the inter-symbol interference may be caused by the noise of the channel 102, this will cause that the data transmission apparatus 100 actually receives the time-domain analog training data signal RC=tad(t)*ch(t), which is affected by the inter-symbol interference, from the channel 102; ch(t) means the time-domain signal of the frequency response of the channel 102.

The ADC 105 for example comprises four analog-to-digital converting circuits respectively corresponding to four-pairs of wires (cables). Each analog-to-digital converting circuit is used to perform the analog-to-digital conversion operation upon a signal of a corresponding signal wire. The ADC 105 is used to perform the analog-to-digital conversion operation upon the received time-domain analog training data signal RC=tad(t)*ch(t) according to a sampling frequency offset to generate a time-domain digital training data signal SR_D=txd(t−$\Delta t_{SFO}$)*ch(t−$\Delta t_{SFO}$) corresponding to such analog training data signal.

The transform circuit 1105 is used to employ an FFT operation to convert/transform the time-domain digital training data signal SR_D=txd(t−$\Delta t_{SFO}$)*ch(t−$\Delta t_{SFO}$) into a frequency-domain training data signal SR_DF=$e^{j\omega \Delta t_{FO}}$TXD·CH wherein SFO means the offset caused by the different sampling frequencies employed by the data transmission apparatus 100 and link partner device 101. Then the feed-forward equalizer circuit 1110 is used to receive the frequency-domain training data signal SR_DF=$e^{j\omega \Delta t_{SFO}}$TXD·CH to perform a frequency-domain Feed-Forward Equalization (FFE) operation upon the frequency-domain training data signal SR_DF=$e^{j\omega \Delta t_{SFO}}$TXD·CH to generate a frequency-domain FFE resultant signal SFFE=$e^{j\omega \Delta t_{SFO}}$TXD·CH·FFE into the inverse transform circuit 1115. The inverse transform circuit 1115 is used to employ an IFFT operation to convert/transform the frequency-domain FFE resultant signal SFFE=$e^{\omega \Delta t_{SFO}}$TXD·CH·FFE from frequency-domain to time-domain to generate a time-domain FFE resultant signal St FFE into the adder 1120. The feed-forward equalizer circuit 1110 is used to cancel pre-cursors which occur prior to the channel impulse response. The feed-back equalizer circuit 1130 is used to cancel post-cursors which occur later than the channel impulse response.

In a first training phase/period of the training mode, the feed-back equalizer circuit 1130 is activated and is not disabled. As shown in FIG. 1, accordingly the two input ends of the adder 1120 are respectively used to receive the time-domain FFE resultant signal St FFE and a feed-back equalization (FBE) resultant signal (FBE_O) generated by the feed-back equalizer circuit 1130 so as to generate a difference resultant signal (St FFE-FBE_O) into the slicer 1125. The adder 1120 at first is used to inverse the FBE resultant signal (FBE_O) received at its one input end and then to add the inversed signal into the signal received at its another input end so as to perform the signal sum operation. Then the slicer 1125 receives the difference resultant signal (St FFE-FBE_O) to generate a slicer resultant signal txd to the feed-back equalizer circuit 1130. The feed-back equalizer circuit 1130 then generates the FBE resultant signal (FBE_O) into the adder 1120 according to the slicer resultant signal txd. After the FBE operation is performed for multiple times, the slicer resultant signal txd equivalently comprises the information of the FBE resultant signal (FBE_O). The frequency estimating/tracking circuit 110 is arranged to output the slicer resultant signal txd, the information of the FBE resultant signal (FBE_O), and the frequency-domain FFE resultant signal $SFFE=e^{j\omega\Delta t_{SFO}}TXD\cdot CH\cdot FFE$ to the processing circuit 115.

The processing circuit 115 for example is a digital signal processor (DSP) and is used for receiving the slicer resultant signal txd, the information of the FBE resultant signal (FBE_O), and the frequency-domain FFE resultant signal $SFFE=e^{j\omega\Delta t_{SFO}}TXD\cdot CH\cdot FFE$ in the first training phase of the training mode, summing the slicer resultant signaltxd and the FBE resultant signal (FBE_O) to perform a frequency spectrum transform such as FFT operation (but not limited) upon the summed signal from time-domain to frequency-domain to generate a frequency-domain feed-back sum resultant signal, calculating one or more difference values between the frequency-domain feed-back sum resultant signal and the frequency-domain FFE resultant signal $SFFE=e^{j\omega\Delta t_{SFO}}TXD\cdot CH\cdot FFE$, and using the one or more difference values to estimate or calculate a phase error. For example, the processing circuit 115 can use the one or more difference values to calculate one or more phase rotation angles, and the average of the one or more phase rotation angles is equal to the phase error to be estimated. After obtaining the phase error, the processing circuit 115 may output the calculated phase error to the frequency generating circuit 120 or may generate a frequency control signal to the frequency generating circuit 120 according to the calculated phase error, to control the frequency generating circuit 120 calibrating its generated local oscillation frequency LO and corresponding phase according to the relation between the received phase error and time so as to make the generated and outputted local oscillation frequency LO be synchronized with the oscillation frequency of the link partner device 101. In addition, the processing circuit 115 may output the calculated phase error to the phase generating circuit 125 or may generate a phase control signal to the phase generating circuit 125 according to the calculated phase error, to control the phase generating circuit 125 interpolating the phase difference value of each corresponding wire according to the relation between the received phase error and time. For example, four phase difference values can be generated for four-pair wires respectively, and can be transmitted to the four analog-to-digital converting circuits (respectively corresponding to the four-pair wires) of the ADC 105 to respectively calibrate the phases of the four analog-to-digital converting circuits, to make the local oscillation frequency LO generated and outputted by the frequency generating circuit 120 not be affected by the phase offsets of the analog-to-digital converting circuits and can be synchronized with the oscillation frequency of the link partner device 101.

Figure 2A:
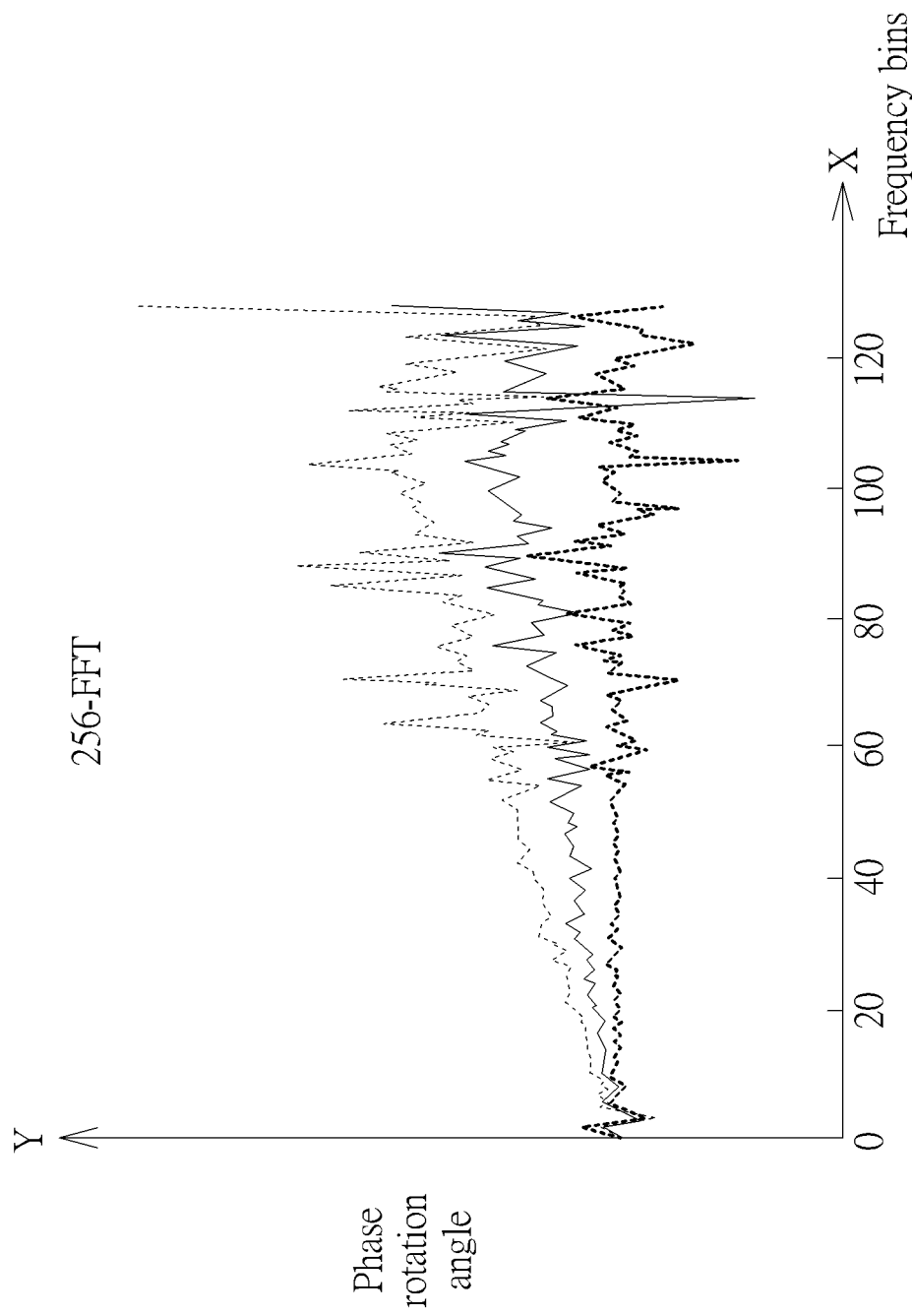
FIG. 2A is a signal spectrum diagram showing the relation of frequency to phase angle relation of the FFT operation when the data transmission apparatus operates in the first training phase of the training mode.
Figure 2B:
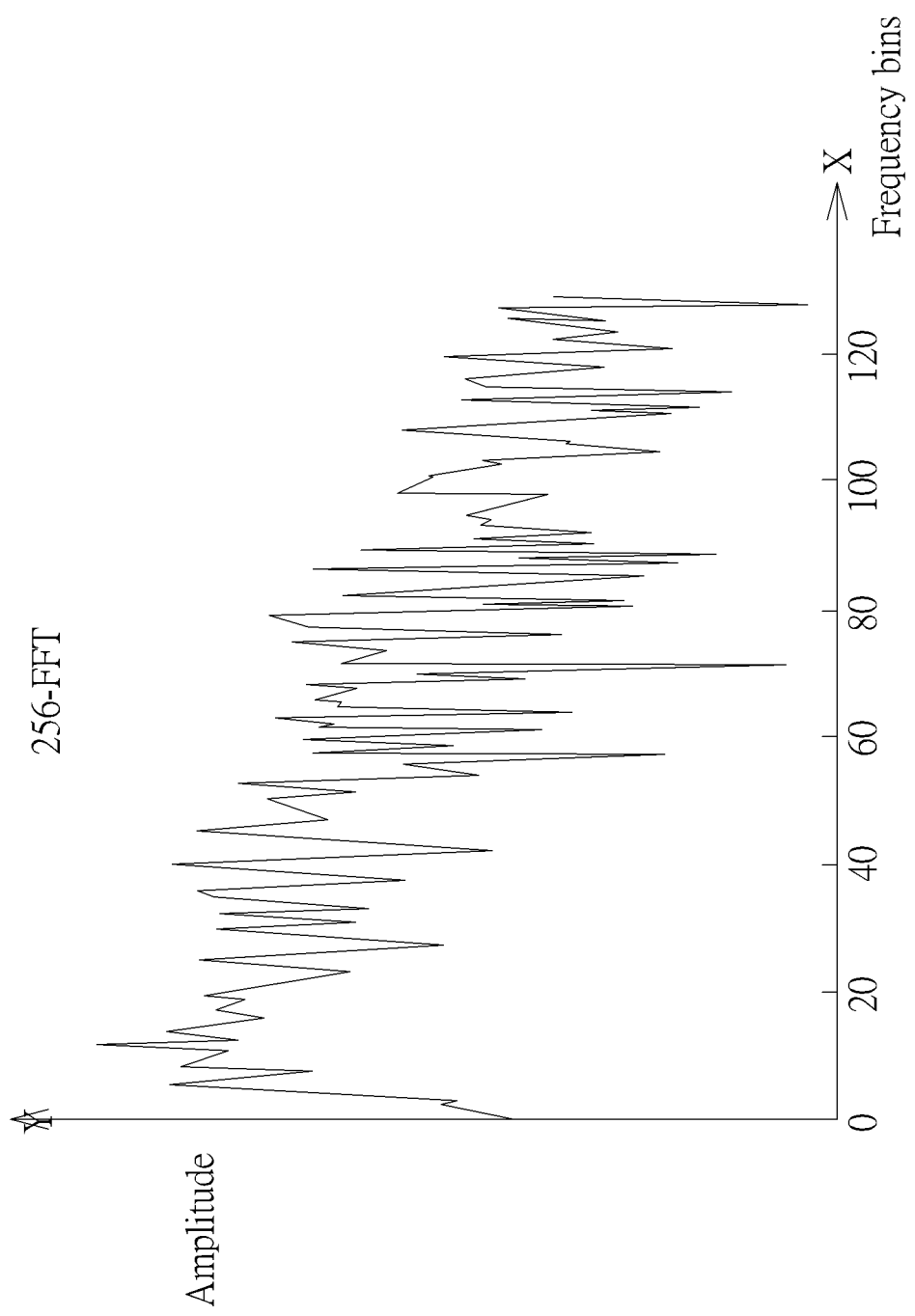
FIG. 2B is a signal spectrum diagram showing the relation of the frequency to amplitude response of the FFT operation of FIG. 2A.

Refer to FIG. 2A in conjunction with FIG. 2B. FIG. 2A is a signal spectrum diagram showing the relation of frequency to phase angle relation of the FFT operation when the data transmission apparatus 100 operates in the first training phase of the training mode. FIG. 2B is a signal spectrum diagram showing the relation of the frequency to amplitude response of the FFT operation of FIG. 2A. As shown in FIG. 2A, the values on the horizontal X-axis represent the different numbers of frequency bins of the FFT operation such as 256-FFT operation with 256 data points. The values on the vertical Y-axis represent the different phase rotation angles. FIG. 2A for example shows three different time delay errors when a signal passes through the channel 102. For instance, the three different time delay errors may be the examples of 0/1024T delay, 80/1024T delay, and 160/1024T delay between the data transmission apparatus 100 and the link partner device 101 wherein the unit of T is a corresponding unit time of the Baud rate. For example, one T is equal to five nanoseconds (but not limited). As shown in FIG. 2A, when the frequency becomes higher (i.e. the number of frequency bins becomes larger), the statistics of the three examples of 0/1024T delay, 80/1024T delay, and 160/1024T delay can show the characteristics of first-order linearity when the signal-to-noise ratio is still good enough. For example, in the example of FIG. 2A, when the number of frequency bins is in the range from zero to 80, the amplitude response of FIG. 2B indicates the signal-to-noise ratio which is not smaller than a specific threshold, and the statistics of the phase rotation angles corresponding to the three examples of 0/1024T delay, 80/1024T delay, and 160/1024T delay respectively and expressly show the characteristics of the increase of the first order linearity. That is, as the number of frequency bins increases, the phase rotation angles of the three examples of 0/1024T sample phase error, 80/1024T sample phase error, and 160/1024T sample phase error respectively increase with different slopes. When the number of frequency bins is larger than 100, in this situation the signal-to-noise ratio indicated by the amplitude response shown in FIG. 2B has been smaller than a specific threshold, and thus the statistics on the frequency spectrums do not show the characteristics of a vivid first order linearity. The processing circuit 115 is used to calculate and estimate the phase rotation angles corresponding to the different frequencies and calculate the average of the phase rotation angles as the estimated phase error according to the statistic characteristics of the signal frequency spectrum when the signal-to-noise ratio is not smaller than the specific threshold, and then to output the estimated phase error to the frequency generating circuit 120.

Figure 3:
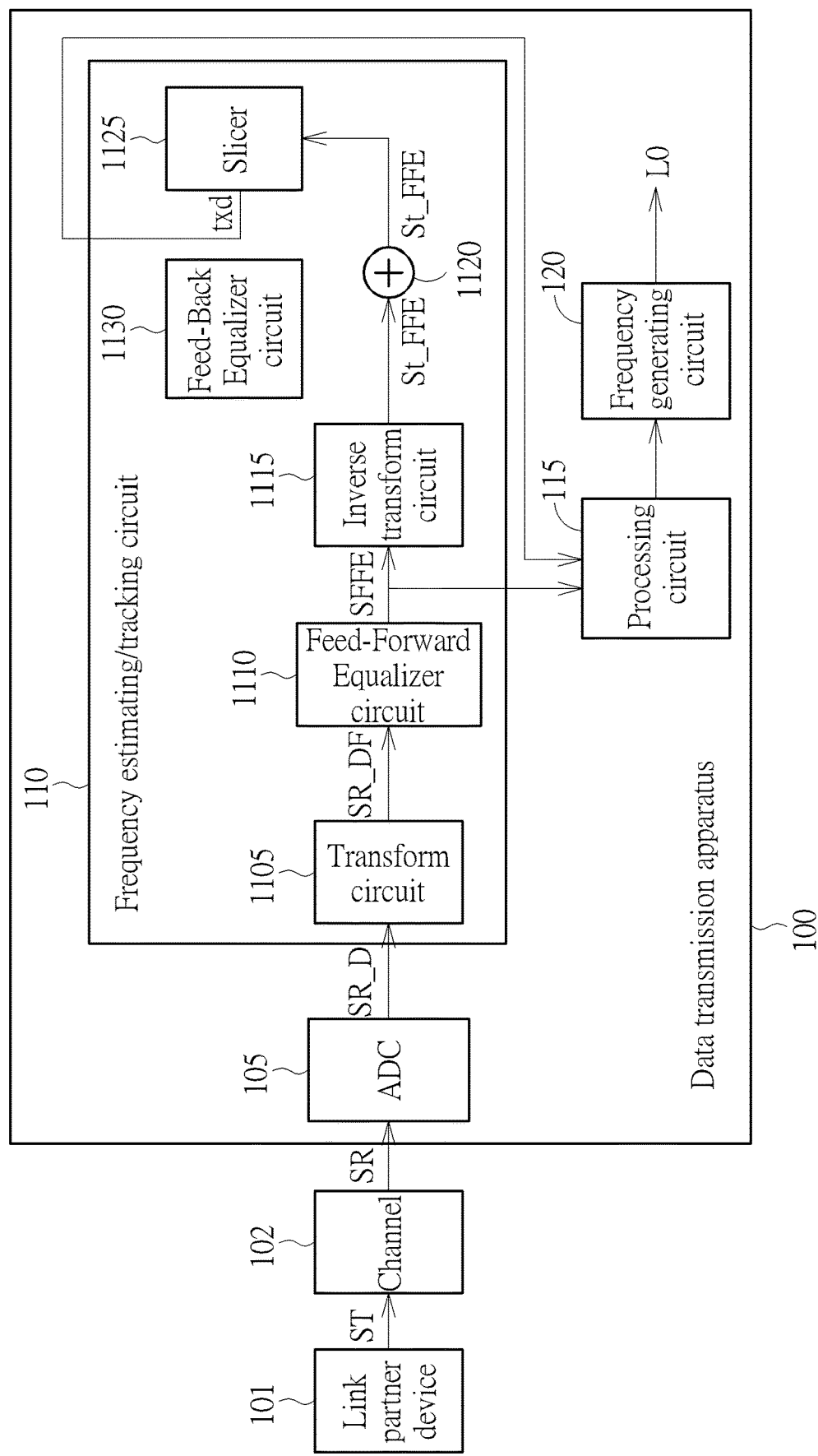
FIG. 3 is a circuit block diagram of the data transmission apparatus when operating in the second training phase/period of the training mode according to the embodiment of FIG. 1.

Refer to FIG. 3. FIG. 3 is a circuit block diagram of the data transmission apparatus 100 when operating in the second training phase/period of the training mode according to the embodiment of FIG. 1. Before entering the second training phase of the training mode, the data transmission apparatus 100 is arranged to generate channel equalized information according to the output of the slicer 1125 and transmit the channel equalized information to the link partner device 101 to make the link partner device 101 be able to transmit a training data signal (or referred to as a pilot signal) ST=txTHP(t) comprising such channel equalized information to the data transmission apparatus 100 when it is in the second training phase of the training mode. When entering the second training phase of the training mode, the feed-back equalizer circuit 1130 is disabled. As shown in FIG. 3, the ADC 105 performs the analog-to-digital conversion operation upon the received time-domain analog training data signal (in this situation it becomes SR=txTHP(t)*ch(t)) according to a sampling frequency offset to generate a time-domain digital training data signal $SR\_D=txTHP(t-\Delta t_{SFO})*ch(t-\Delta t_{SFO})$ corresponding such analog training data signal. The transform circuit 1105 is used to employ the FFT operation to transform/convert the time-domain digital training data signal $SR\_D=txTHP(t-\Delta t_{SFO})*ch(t-\Delta t_{SFO})$ into a frequency-domain training data signal $e^{j\omega\Delta t_{SFO}}TXTHP\cdot CH$. Then the feed-forward equalizer circuit 1110 is used to receive the frequency-domain training data signal $SR\_DF=e^{j\omega t_{SFO}}TXTHP\cdot CH$ to perform the frequency-domain FFE operation upon the frequency-domain training data signal $SR\_DF=e^{j\omega\Delta t_{SFO}}TXTHP\cdot CH$ to generate the frequency-domain FFE resultant signal $SFFE=e^{j\omega t_{SFO}}TXTHP\cdot CH\cdot FFE$ into the inverse transform circuit 1115. The inverse transform circuit 1115 is used to employ the IFFT operation to transform/convert the frequency-domain FFE resultant signal SFFE=$e^{j\omega\Delta t_{SFO}}$TXTHP·CH·FFE from the frequency-domain into the time-domain to generate a time-domain FFE resultant signal St FFE into an input end of the adder 1120. In the second training phase of the training mode, the feed-back equalizer circuit 1130 is disabled, and thus the signal at the output end of the adder 1120 is equal to the received time-domain FFE resultant signal St FFE. Then the slicer 1125 receives the time-domain FFE resultant signal St FFE to generate the slicer resultant signal txd. Since the feed-back equalizer circuit 1130 is disabled, the slicer resultant signal txd in the second training phase equivalently is not involved with the feed-back equalizer circuit 1130. Then the frequency estimating/tracking circuit 110 is used to output the slicer resultant signal txd and the frequency-domain FFE resultant signal SFFE=$e^{j\omega\Delta t_{SFO}}$TXTHP·CH·FFE generated by the feed-forward equalizer circuit 1110 to the processing circuit 115.

The processing circuit 115 in the second training phase of the training mode is used for receiving the slicer resultant signal txd and the frequency-domain FFE resultant signal SFFE=$e^{j\omega\Delta t_{SFO}}$TXTHP·CH·FFE, performing a frequency spectrum transform such as FFT operation (but not limited) upon the slicer resultant signal txd to transform such signal from time-domain into frequency-domain to generate a frequency-domain slicer resultant signal, calculating multiple difference values between the frequency-domain slicer resultant signal and the frequency-domain FFE resultant signal SFFE=$e^{j\omega\Delta t_{SFO}}$TXTHP·CH·FFE, and using the multiple difference values to estimate or calculate a phase error. For example, the processing circuit 115 may perform the frequency spectrum transform upon one or more difference values to calculate one or more phase rotation angles, and the average of the one or more phase rotation angles is the phase error to be estimated. After obtaining the phase error, the processing circuit 115 is used to output the calculated phase error to the frequency generating circuit 120 or output a frequency control signal corresponding to the phase error to the frequency generating circuit 120. The frequency generating circuit 120 is used to calibrate its generated and outputted local oscillation frequency LO and corresponding phase according to the relation between the received phase error and time or according to the frequency control signal, to make or keep the generated and outputted local oscillation frequency LO be synchronized with the oscillation frequency of the link partner device 101. In addition, the processing circuit 115 may output the calculated phase error to the phase generating circuit 125 or may generate a phase control signal to the phase generating circuit 125 according to the calculated phase error, to control the phase generating circuit 125 interpolating the phase difference value of each corresponding wire line based on the relation between the received phase error and time. For example, four phase difference values can be generated for four-pairs wire lines, and can be transmitted to four analog-to-digital converting circuits (respectively corresponding to the four-pairs wire lines) of the ADC 105 to respectively calibrate the phases of the four analog-to-digital converting circuits so as to make the local oscillation frequency LO generated and outputted by the frequency generating circuit 120 not be affected by the phase variations of the analog-to-digital converting circuits and can be synchronized with the oscillation frequency of the link partner device 101. In the second training phase of the training mode, the statistics results, associated with the frequency spectrum, generated and performed by the processing circuit 115 are similar to those mentioned in the embodiments of FIG. 2A and FIG. 2B and are not detailed for brevity.

It should be noted that in this embodiment the training mode comprises the first and second different training phases/periods. One of the objectives is that the data transmission apparatus 100 is able to inform the link partner device 101 of the estimated channel equalized information result after the channel/signal has been tracked for a specific time period, so that the frequency/phase error can be tracked and it is not needed for the frequency estimating/tracking circuit 110 to perform the feed-back equalization operation. This can significantly reduce the computation loading of the frequency estimating/tracking circuit 110. However, in other embodiments, the data transmission apparatus 100 can employ and execute/perform the feed-back equalization operation to track the frequency/phase error in the whole training mode. This is not intended to be a limitation of the invention.

Additionally, the employed frequency-domain FFE technical solution in the embodiments is capable of more rapidly and accurately estimate and/or track the phase variation and/or frequency variation of the signal of a link partner device can be also applied to an Energy-Efficient-Ethernet (EEE) mode. The EEE mode comprises a quiet period and a refresh period. In the quiet period, no data is transmitted between the data transmission apparatus 100 and the link partner device 101 through the channel 102. In the refresh period, a refresh data pattern is used to update or refresh information of the channel 102. Since it is in the EEE mode, the refresh data pattern of the refresh period is not like to the above-mentioned training data signal having a longer data length. Accordingly, the conventional time-domain phase tracking operation which needs a comparatively longer time period to achieve convergence is not suitable for the refresh period of the EEE mode. If the phase variation changes sorely, the conventional time-domain phase tracking operation is unable to track the signal. If a conventional time-domain phase tracking operation needs more than two refresh periods to achieve convergence, then it is usual and easy for such conventional operation to erroneously determine merely a portion of phase errors as the actual change of the phase error. Comparatively, in the embodiments of the invention, the frequency-domain FFE operation is employed to directly estimate or track the phase/frequency error, and thus the technical solutions provided in the embodiments is more suitable for the EEE mode.

Figure 4:
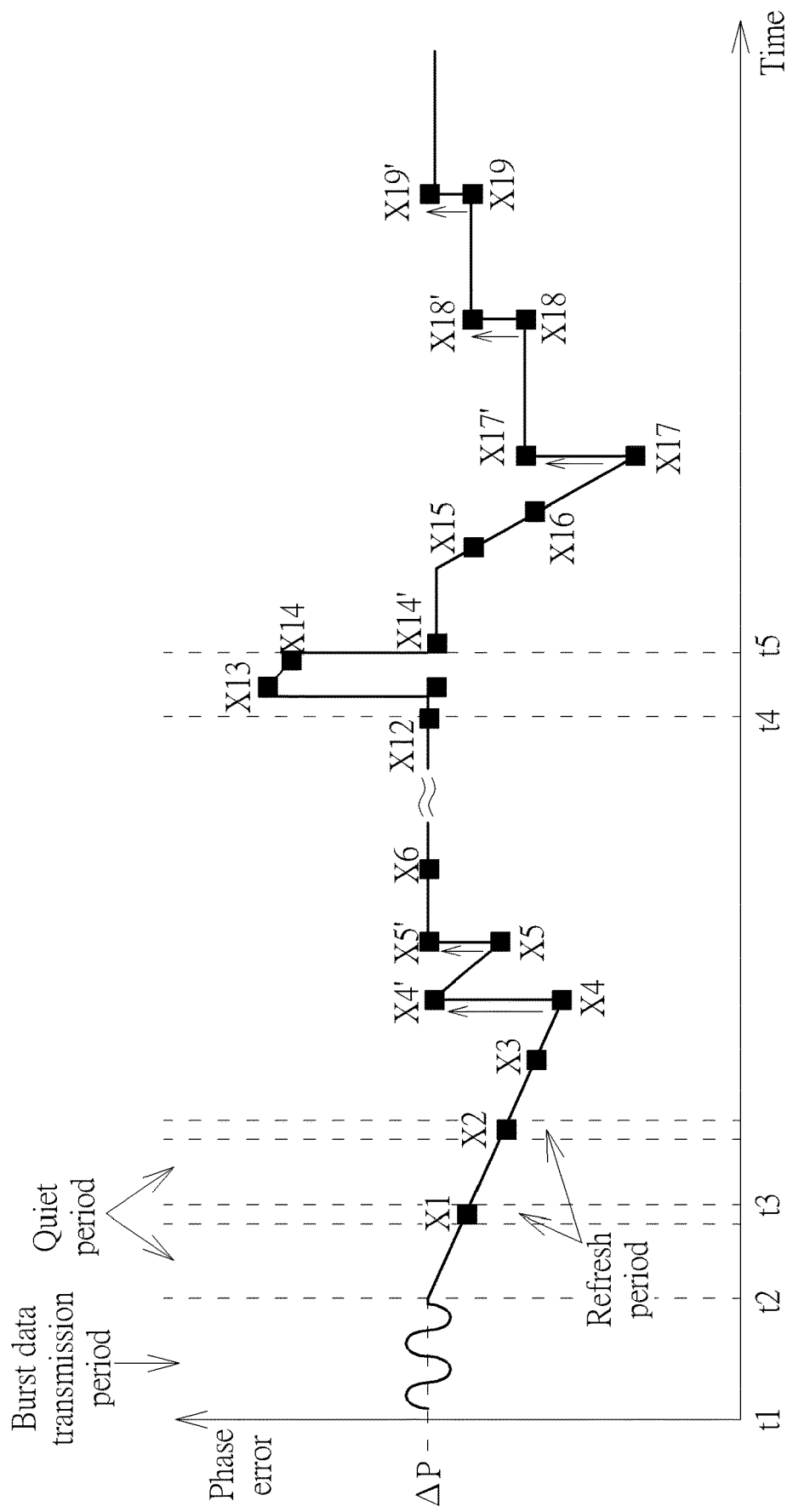
FIG. 4 is a diagram of the operations of the data transmission apparatus 100 in FIG. 1 according to one embodiment of the invention.

Refer to FIG. 4. FIG. 4 is a diagram of the operations of the data transmission apparatus 100 in FIG. 1 according to one embodiment of the invention. As shown in FIG. 4, the horizontal X-axis indicates time while the vertical Y-axis indicates the change of the phase error as time changes. Ideally, for phase locking and/or frequency locking, the processing circuit 115 of the data transmission apparatus 100 is used to transmit the calculated average of the phase rotation angle(s) as the estimated phase error to the frequency generating circuit 120 to control the frequency generating circuit 120 locking the phase error between the phases of the local oscillation frequency generated by the frequency generating circuit 120 and oscillation frequency of the link partner device 101 at a target error value, so that the local oscillation frequency of the data transmission apparatus 100 can be calibrated and kept to be synchronized with the oscillation frequency of the link partner device 101; the target error value for example is equal to ΔP as shown in FIG. 4.

In addition, for example (but not limited), the data transmission apparatus 100 may be a hybrid device having the above-mentioned frequency-domain FFE technical solutions and a conventional time-domain phase tracking operation. For example, in the data mode, when the disclosed frequency-domain FFE technical solution has calibrated the phase error into a smaller range, the conventional time-domain phase tracking operation instead can be used to track and calibrate the phase error. For example, in FIG. 4, in the data mode, from time t1 to time t2, the results of smaller phase error variations are tracked by the conventional time-domain phase tracking operation to calibrate the phase of the local oscillation frequency to make the phase error between the phase of the local oscillation frequency and the phase of oscillation frequency of the link partner device 101 be locked at the target error value $\Delta P$ so that the local oscillation frequency can be kept to be synchronized with the oscillation frequency of the link partner device 101.

Then, after time t2, when it is in the quiet period of the EEE mode, no data is transmitted between the two devices. Thus, in the quiet period, the frequency error/offset estimated in the data mode by transmitting bust data between the two devices will begin to vary and cause the phase error, so that the phase error varies from the target difference/error value.

Then, when/after time t3 the data transmission apparatus 100 alternates between the refresh period of the EEE mode and the quiet period. For a first scenario example of collecting refresh data only in the refresh period (i.e. from time t3 to time t4 when the apparatus 100 exits the burst data transmission period and alternates between the refresh period and quiet period for the first time), in the data mode of the apparatus 100 implemented as a hybrid apparatus, a significant amount of phase error for example may result from error (s) of resultantly tracked frequency-term(s) when the conventional time-domain phase tracking technical solution/operation in the data mode is used in the burst data transmission period to track the phase error and perform frequency calibration or a phase error for example may suddenly appear when the apparatus 100 enter the EEE mode. In this situation, even though data transmission is discontinuous (i.e. no data is transmitted during the quiet period), the processing circuit 115 of the data transmission apparatus 100 is still able to use the disclosed frequency-domain FFE technical solution/operation to analyze and estimate the phase error, wait for the accumulated amount of phase errors, and directly perform one-time phase correction/calibration when the accumulated amount is above a specific accumulation value, so as to achieve the effect of rapidly correcting phase errors. For example, in FIG. 4, points X1 to X3 respectively represent that the accumulated amount of phase errors with time varying gradually deviates/departs from the above phase error value $\Delta P$, and the point X4 represent that the accumulated amount of phase errors with time varying has reached or has been above the specific accumulation value. As indicated by X4', the processing circuit 115 directly controls and compensates the phase of the local oscillation frequency generated by the frequency generating circuit 120 for only one time and/or adjusts the phases of the analog-to-digital converting circuits corresponding to the four-pairs wires for only one time, to make a phase error between the above-mentioned phase(s) and the phase of the oscillation frequency of the link partner device 101 be adjusted to the phase error value $\Delta P$. Then, the processing circuit 115 calculates the frequency error and phase error, which are to be corrected/calibrated, after collecting an enough number of separate/scattered refresh data, so that the processing circuit 115 is able to directly control and compensate the phase of the local oscillation frequency generated by the frequency generating circuit 120 for only one time and/or adjusts the phases of the analog-to-digital converting circuits corresponding to the four-pairs wires for only one time to make a phase error between the above-mentioned phase(s) and the phase of the oscillation frequency of the link partner device 101 be adjusted to the phase error value $\Delta P$, as indicated by point X5'. It should be noted that the examples of FIG. 4 are used to explain the phase compensation operation of the data transmission apparatus 100 under different conditions. The scale of FIG. 4 is not meant to be a limitation, and the curve of FIG. 4 may vary depending on various conditions. For example, it may be influenced by various types of noise. Later, in the points X6 to X12, the values of frequency and phase(s) can be maintained at correct values.

Additionally, for a second scenario example of the refresh period from time t4 to time t5, X13 in FIG. 4 for example shows that the discontinuous data points, generated due to that the either the data transmission 1001 or the link partner device 101 may significantly adjust its signal phase in the quiet period of the EEE mode, result in that the phase error value between the two devices suddenly and significantly deviate from the target difference value $\Delta P$. In this situation, the processing circuit 115 can perform one-time compensation to directly and rapidly control and compensate the phase of the local oscillation frequency generated by the frequency generating circuit 120 by using the disclosed frequency-domain equalization technical solution/operation, to make the phase error between the above-mentioned phase and the phase of oscillation frequency of the link partner device 101 be adjusted to the target difference value $\Delta P$. For example, the phase error represented by the point X14 can be directly compensated and adjusted to the target error value $\Delta P$, as shown by point X14'. If the data transmission apparatus 100 is implemented by using the above-mentioned hybrid device, then After the phase error indicated by the point X14 has been rapidly compensated to the target error value $\Delta P$, the data transmission apparatus 100 can switch from the disclosed frequency-domain equalization technical solution/operation to the conventional time-domain phase tracking solution/operation to keep the tracked phase difference at the target error value $\Delta P$; this is not intended to be a limitation of the invention.

Additionally, for a third scenario example of the refresh period after time t5, the phase error may more rapidly and significantly deviate from the target error value $\Delta P$ due to that either the data transmission apparatus 100 or the link partner device 101 may significantly adjust its signal frequency in the quiet period of the EEE mode. In this situation, the data points are not continuous. For example, X15 and X16 in FIG. 4 respectively show that the phase error more rapidly and significantly deviate from the target error value $\Delta P$, and X17 represents that the accumulated amount of phase errors has reached or has been above the specific accumulation value. The processing circuit 115 may analyze and calculate to obtain the change/variation of the difference amount between the currently accumulated amount of phase errors and the target error value $\Delta P$ by using the disclosed frequency-domain equalization technical solution/operation, and then estimate the phase error amount, to be adjusted, according to the change/variation of the difference amount and a corresponding time period corresponding to the change/variation, to rapidly calibrate the phase error between the data transmission apparatus 100 and link partner device 100 as the target error value $\Delta P$ for only one time or to make the phase error between the data transmission apparatus 100 and link partner device 100 gradually approach the target error value $\Delta P$ for multiple times. For example, the apparatus 100 can calibrate the phase error indicated by X17 as that indicated by X17' for the first time, then calibrate the phase error indicated by X18 as that indicated by X18 for the second time, and finally calibrate the phase error indicated by X19 as that indicated by X19', i.e. the phase error value ΔP, to accordingly correct and compensate the local oscillation frequency generated by the frequency generating circuit 120. It should be noted that the operation of controlling the phase error gradually approaching the target error value ΔP is not limited to only three times. The number of performing the operation of controlling the phase error gradually approaching the target error value ΔP can be the other value and it actually can be configured or determined based on a user's requirements. After the phase error has been calibrated as or approached the target error value ΔP, the data transmission apparatus 100 can instead employ the conventional time-domain phase tracking operation to track and keep the frequency of the data transmission apparatus 100 be synchronized with that of the link partner device 101 if the data transmission apparatus 100 having the capabilities of the above-mentioned hybrid device.

Figure 5:
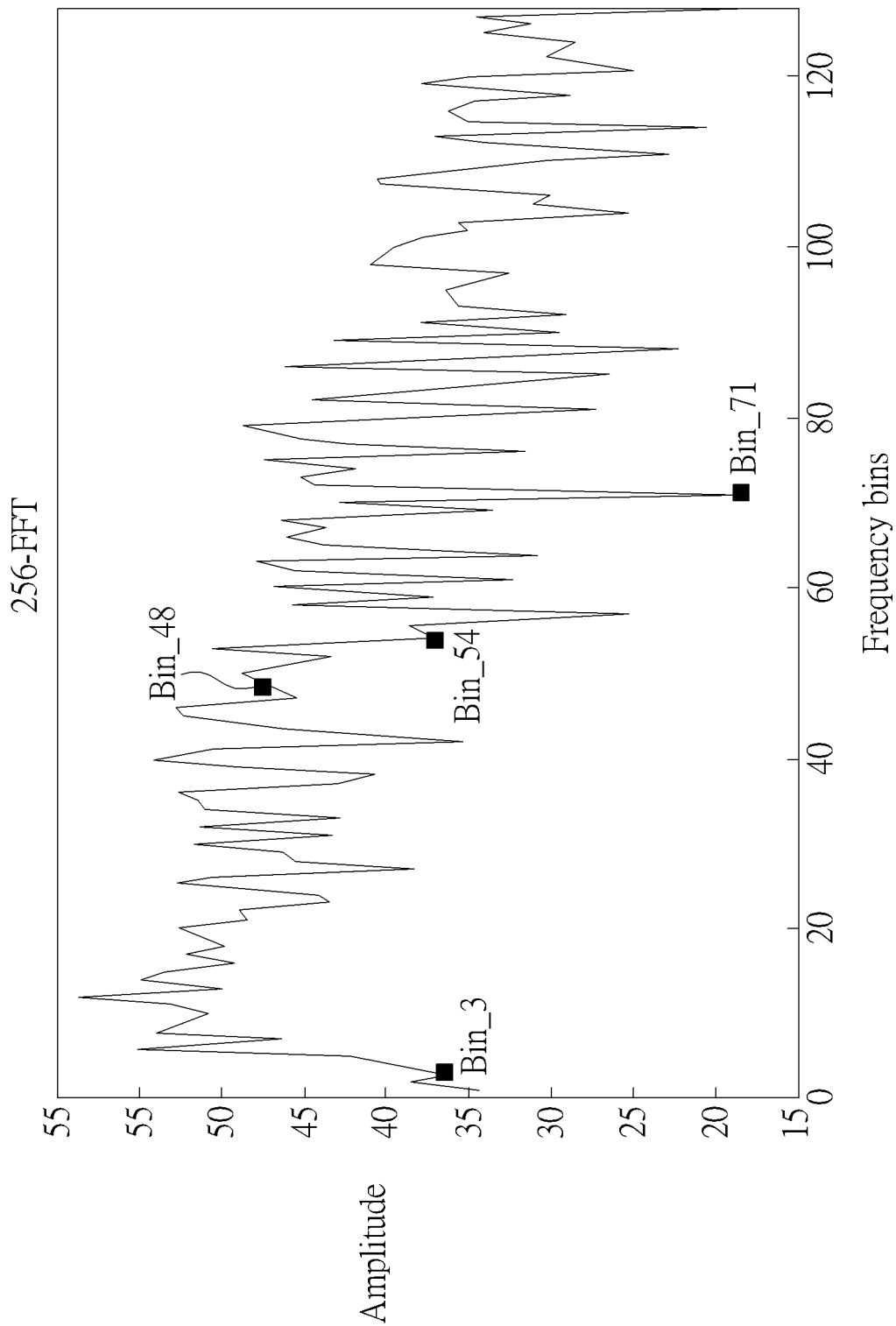
FIG. 5 is a diagram illustrating an example of an energy distribution for positive frequencies from 256-points FFT operation according to an embodiment of the invention.

Additionally, the processing circuit 115 may estimate or calculate one or more phase rotation angles by using the frequency spectrum statistics. If the processing circuit 115 uses the FFT operation to perform the frequency spectrum statistics, then a portion of phase rotation angles can be selected according to high/low of the signal-to-noise ratio of the amplitude-frequency response and the actual frequency bin numbers at a portion of frequency bins on the frequency spectrum so as to perform an average upon the selected phase rotation angles to calculate the phase error which is to be estimated and derived. Refer to FIG. 5. FIG. 5 is a diagram illustrating an example of an energy distribution for positive frequencies from 256-points FFT operation according to an embodiment of the invention. For example, in FIG. 5, taking the examples of different bin numbers Bin_3, Bin_48, Bin_54, and Bin_71 for illustrative (but not limited), the processing circuit 115 can determine that the energy of bin number Bin_48 is clearly higher than those of the other three bin numbers and thus can take a precedence to select a phase rotation angle corresponding to the bin number Bin_48. If only a single one phase rotation angle is to be selected, then the phase rotation angle corresponding to the bin number Bin_48 is used as the phase error to be estimated and calculated. Instead, if it is needed to further select other phase rotation angles, then the processing circuit 115 can determine that the energy of bin number Bin_3 is neat to that of bin number Bin_54 and the signal-to-noise ratios of two bin numbers are higher than a specific value. Since the bin number (i.e. 54) of bin Bin_54 is clearly larger than the bin number (i.e. 3) of bin Bin_3, the processing circuit 115 selects a phase rotation angle corresponding to the bin number Bin_54 and then perform an average up on the phase rotation angle of bin number Bin_48 and the phase rotation angle of bin number Bin_54 to calculate and obtain the phase error to be estimated. In this example, since the energy of bin number Bin_71 is too low and its signal-to-noise ratio is not enough higher than the specific value, the phase rotation angle of bin number Bin_71 is not selected. It should be noted that FIG. 5 shows only one training data pattern among multiple training data patterns which are for example transmitted during one refresh period. The status of the channel 102 may be changed during the same refresh period, and thus the processing circuit 115 may be arranged to select phase rotation angles corresponding to different frequency bin numbers from multiple training data patterns during the same refresh period.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data transmission apparatus applied to a high-speed wired network, comprising An analog-to-digital converter (ADC), for receiving a time-domain analog training data signal, transmitted from a link partner device and through a channel, to perform an analog-to-digital conversion operation upon the time-domain analog training data signal to generate a time-domain digital training data signal;

a transform circuit, coupled to the ADC, for converting the time-domain digital training data signal into a frequency-domain training data signal;

a feed-forward equalizer circuit, coupled to the transform circuit, for receiving the frequency-domain training data signal and performing a frequency-domain feed-forward equalization (FFE) operation upon the frequency-domain training data signal to generate a frequency-domain FFE resultant signal;

an inverse transform circuit, coupled to the feed-forward equalizer circuit, for converting the frequency-domain FFE resultant signal into a time-domain FFE resultant signal;

an adder, coupled to the inverse transform circuit and a feed-back equalizer circuit, for generating a difference resultant signal according to the time-domain FFE resultant signal generate by the inverse transform circuit and an feed-back equalization (FBE) resultant signal generated by the feed-back equalizer circuit;

a slicer, coupled to the adder and the feed-back equalizer circuit, for receiving the difference resultant signal to generate a slicer resultant signal to the feed-back equalizer circuit; and the feed-back equalizer circuit, coupled to the slicer and the adder, for generating the FBE resultant signal according to the slicer resultant signal.

2. The data transmission apparatus of claim 1, wherein the data transmission apparatus comprises a training mode and a data mode; the training mode comprises a first training period and a second training period following the first training period; when the data transmission apparatus is in the first training period, the feed-back equalizer circuit is enabled; when the data transmission apparatus is in the second training period, the feed-back equalizer circuit is disabled.

3. The data transmission apparatus of claim 2, further comprising:

a processing circuit, coupled to the FFE circuit and the slicer; and a frequency generating circuit, coupled to the processing circuit;

wherein in the first training period the processing circuit is arranged to estimate a phase error according to the frequency-domain FFE resultant signal, the FBE resultant signal, and the slicer resultant signal, and then to control and calibrate a local oscillation frequency generated by the frequency generating circuit according to the estimated phase error.

4. The data transmission apparatus of claim 3, wherein in the first training period the processing circuit is arranged to sum the slicer resultant signal and the FBE resultant signal to generate a sum resultant signal, perform a frequency spectrum transform upon the sum resultant signal to generate a frequency-domain feed-back sum resultant signal, calculate one or more difference values according to the frequency-domain FFE resultant signal and the frequency-domain feed-back sum resultant signal, perform a frequency spectrum statistics upon the one or more difference values, calculate at least one phase rotation angle of the one or more difference values on the frequency spectrum statistics, and perform an average according to the at least one phase rotation angle to calculate the phase error.

5. The data transmission apparatus of claim 4, wherein the processing circuit is arranged to select a portion of phase rotation angles according to at least one signal-noise-ratio corresponding to the at least one phase rotation angle on the frequency spectrum statistics and a number of frequency bins, and then perform an average upon the portion of phase rotation angles to calculate and obtain the phase error.

6. The data transmission apparatus of claim 3, wherein the processing circuit in a refresh period of an Energy-Efficient Ethernet mode of the data transmission apparatus is arranged to estimate a phase error according to the frequency-domain FFE resultant signal, the FBE resultant signal, and the slicer resultant signal and then control and calibrate a local oscillation frequency generated by the frequency generating circuit according to the estimated phase error.

7. The data transmission apparatus of claim 3, wherein the processing circuit in the second training period is arranged for receiving the frequency-domain FFE resultant signal and the slicer resultant signal, performing a frequency spectrum transform upon the slicer resultant signal to generate a frequency-domain slicer resultant signal, calculating one or more difference values according to the frequency-domain FFE resultant signal and the frequency-domain slicer resultant signal, performing a frequency spectrum statistics upon the one or more difference values, calculating at least one phase rotation angle of the one or more difference values on the frequency spectrum statistics, and performing an average according to the at least one phase rotation angle to calculate and obtain the phase error.

8. The data transmission apparatus of claim 3, further comprising:
a phase generating circuit, coupled to the processing circuit;
wherein the processing circuit is arranged to generate a phase control signal to the phase generating circuit according to the estimated phase error so as to control a phase generated by the phase generating circuit to adjust one or more phases of at least one analog-to-digital transform circuit of the ADC.

9. A method of a data transmission apparatus applied to a high-speed wired network, comprising:
using an analog-to-digital converter £ADC) to receive a time-domain analog training data signal, sent from a link partner device and through a channel, to perform an analog-to-digital conversion operation upon the time-domain analog training data signal to generate a time-domain digital training data signal;
converting the time-domain digital training data signal into a frequency-domain training data signal;
receiving the frequency-domain training data signal and performing a frequency-domain feed-forward equalization (FFE) operation upon the frequency-domain training data signal to generate a frequency-domain FFE resultant signal;
converting the frequency-domain FFE resultant signal into a time-domain FFE resultant signal;
using an adder to generate a difference resultant signal according to the time-domain FFE resultant signal and a feed-back equalization (FBE) resultant signal generated by a feed-back equalizer circuit;
using a slicer to receive the difference resultant signal to generate a slicer resultant signal to the feed-back equalizer circuit; and
using the feed-back equalizer circuit to generate the FBE resultant signal according to the slicer resultant signal.

10. The method of claim 9, wherein the data transmission apparatus comprises a training mode and a data mode; the training mode comprises a first training period and a second training period following the first training period; when the data transmission apparatus is in the first training period, the feed-back equalizer circuit is enabled; when the data transmission apparatus is in the second training period, the feed-back equalizer circuit is disabled.

11. The method of claim 10, further comprising:
estimating a phase error according to the frequency-domain FFE resultant signal, the FBE resultant signal, and the slicer resultant signal when the data transmission apparatus is in the first training period; and
controlling and calibrating a local oscillation frequency generated by a frequency generating circuit according to the estimated phase error.

12. The method of claim 11, wherein the step of estimating the phase error according to the frequency-domain FFE resultant signal, the FBE resultant signal, and the slicer resultant signal when the data transmission apparatus is in the first training period comprises:
summing the slicer resultant signal and the FBE resultant signal and performing frequency spectrum transform upon a sum result to generate a frequency-domain feed-back sum resultant signal;
calculating at least one difference value according to the frequency-domain FFE resultant signal and the frequency-domain feed-back sum resultant signal;
calculating at least one phase rotation angle of the at least one difference value on a frequency spectrum statistics; and
performing an average according to the at least one phase rotation angle to calculate and obtain the phase error.

13. The method of claim 11, wherein the step of performing the average according to the at least one phase rotation angle to calculate and obtain the phase error comprises:
selecting a portion of phase rotation angles according to at least one signal to noise ratio corresponding to the at least one phase rotation angle on the frequency spectrum statistics and a number of frequency bins; and
averaging the portion of phase rotation angles to calculate and obtain the phase error.

14. The method of claim 11, further comprising:
estimating a phase error according to the frequency-domain FFE resultant signal, the FBE resultant signal, and the slicer resultant signal and then controlling and calibrating a local oscillation frequency generated by the frequency generating circuit according to the estimated phase error, in a refresh period of an Energy-Efficient Ethernet mode of the data transmission apparatus.

15. The method of claim 11, further comprising:
receiving the frequency-domain FFE resultant signal and the slicer resultant signal in the second training period;

performing a frequency spectrum transform upon the slicer resultant signal to generate a frequency-domain slicer resultant signal;

calculating one or more difference values according to the frequency-domain FFE resultant signal and the frequency-domain slicer resultant signal;

performing a frequency spectrum statistics upon the one or more difference values;

calculating at least one phase rotation angle of the one or more difference values on the frequency spectrum statistics and then performing an average according to the at least one phase rotation angle to calculate and obtain the phase error.

16. The method of claim 11, further comprising:

providing a phase generating circuit; and generating a phase control signal according to the estimated phase error into the phase generating circuit to control a phase generated by the phase generating circuit to adjust a phase of the ADC.

* * * * *